United States Patent
Saeki (10) Patent No.: US 11,194,723 B2
(45) Date of Patent: Dec. 7, 2021

(54) DATA PROCESSING DEVICE, STORAGE DEVICE, AND PREFETCH METHOD

(71) Applicant: HITACHI, LTD., Tokyo (JP)

(72) Inventor: Yuji Saeki, Tokyo (JP)

(73) Assignee: HITACHI, LTD., Tokyo (JP)

(*) Notice: Subject to any disclaimer, the term of this patent is extended or adjusted under 35 U.S.C. 154(b) by 175 days.

(21) Appl. No.: 16/572,230

(22) Filed: Sep. 16, 2019

(65) Prior Publication Data
US 2020/0272566 A1 Aug. 27, 2020

(30) Foreign Application Priority Data
Feb. 21, 2019 (JP) .............................. JP2019-029009

(51) Int. Cl.
| | |
|---|---|
| *G06F 12/0862* | (2016.01) |
| *G06F 12/0882* | (2016.01) |
| *G06F 3/06* | (2006.01) |
| *G06N 5/04* | (2006.01) |
| *G06F 16/903* | (2019.01) |
| *G06N 3/04* | (2006.01) |

(52) U.S. Cl.
CPC ........ *G06F 12/0862* (2013.01); *G06F 3/0644* (2013.01); *G06F 3/0647* (2013.01); *G06F 3/0685* (2013.01); *G06F 12/0882* (2013.01); *G06F 16/903* (2019.01); *G06N 5/04* (2013.01); *G06F 3/0607* (2013.01); *G06N 3/04* (2013.01)

(58) Field of Classification Search
CPC .. G06F 12/0862; G06F 16/903; G06F 3/0644; G06F 3/0647; G06F 3/0685; G06F 12/0882; G06F 3/0607; G06N 5/04; G06N 3/04

See application file for complete search history.

(56) References Cited

U.S. PATENT DOCUMENTS

| | | | |
|---|---|---|---|
| 7,805,580 B2 | 9/2010 | Hirzel et al. | |
| 8,112,755 B2 | 2/2012 | Apecible et al. | |
| 8,140,746 B2 | 3/2012 | Trichina et al. | |
| 8,607,005 B2 | 12/2013 | Boyd et al. | |
| 9,298,633 B1 | 3/2016 | Zhao et al. | |
| 2015/0282084 A1* | 10/2015 | Katori | H04W 52/0225 370/311 |
| 2016/0381176 A1 | 12/2016 | Cherubini et al. | |
| 2017/0185520 A1* | 6/2017 | Matsuo | G06F 12/0862 |
| 2019/0347048 A1* | 11/2019 | Kazama | G06F 3/0605 |

OTHER PUBLICATIONS

Hashemi, M., Swersky, K., Smith, J., Ayers, G., Litz, H., Chang, J., Kozyrakis, C. and Ranganathan, P., Jul. 2018, Learning memory access patterns. In International Conference on Machine Learning (pp. 1919-1928). PMLR. (Year: 2018).*

* cited by examiner

*Primary Examiner* — Eric Cardwell
(74) *Attorney, Agent, or Firm* — Volpe Koenig (57) ABSTRACT

The prefetch control is optimized according to a data pattern. The model selection unit selects inference units from outside of the device driver and replace each of the inference units according to the type of data analysis. The inference units, each of which is a neural network, predict an address region of the SSD based on I/O trace data collected by the device driver and instruct the device driver to prefetch from the outside based on the prediction result. The prefetch execution unit performs prefetch for the storage cache allocated to the SCM based on the prediction by a neural network associated with the query and the database.

11 Claims, 10 Drawing Sheets

DATA PROCESSING DEVICE, STORAGE DEVICE, AND PREFETCH METHOD

BACKGROUND OF THE INVENTION

1. Field of the Invention

The present invention relates to a data processing device, a storage device, and a prefetch method capable of using a Storage Class Memory (SCM) as a cache.

2. Description of the Related Art

Access time of a flash storage has a gap of about 1000 times as compared with a case of accessing data stored in a Dynamic Random Access Memory (DRAM). Therefore, in a big data analysis using an in-memory database, the number of servers with a total main storage capacity equal to or larger than a data size to be analyzed is necessary, which leads to an increase in cost. Therefore, it is expected that the main storage capacity is expanded and the number of the servers is reduced by applying a next-generation nonvolatile memory represented by a 3D XPoint memory of Intel Corporation, which appears in the market as a storage class memory that fills a storage hierarchy gap.

The 3D XPoint memory is mounted on a Dual Inline Memory Module (DIMM) having a same shape as that of the DRAM, can be accessed in a cash line unit, and the DRAM can be used as a cache of the 3D XPoint memory. That is, as a system in which hardware performs a memory access control of a related art in which the storage capacity and hierarchy are increased by one stage, it is possible to execute a program for processing data equal to or larger than a related-art type size on the main storage.

On the other hand, for a mechanism for swapping data overflowed from the 3D XPoint memory with data stored in the flash storage, it is basic for an Operating System (OS) to read from and write to the flash storage in response to a page fault interruption, and an overhead is required regardless of a presence or absence of the 3D XPoint memory. Therefore, although the in-memory database mounts a mechanism for holding data with high access frequency in the main storage and performs reading/writing for optimizing a data arrangement, a significant modification is required for the data arrangement mechanism due to the increase in the storage hierarchy. In addition, when there is a prefetch mechanism from the flash storage to the 3D XPoint memory at a platform level without depending on a database, a plurality of databases in accordance with a data format can be realized without mounting another prefetch mechanism.

It is announced that in Power Max, which is a flash storage of Dell/EMC, a storage OS machine learns a past read/write pattern and stores data that is predicted to have a high access frequency in the storage class memory.

Further, an Intel Memory Drive Technology that includes a hypervisor which improves performance by prefetching data from an Optane to the main storage by an algorithm such as machine learning can be used in the Optane, which is a 3D XPoint product of a SSD card type of Intel.

Examples of the related technical include U.S. Pat. Nos. 8,607,005, 7,805,580, 8,112,755, US Patent Application Publication 2016/0381176, U.S. Pat. Nos. 8,140,746, 9,298, 633.

However, in the related technique described above, it is expected whether a control method and an algorithm of the prefetch according to an applied program to be executed are appropriate, and a flexible control method needs to be changed. Further, a new prediction model and an algorithm cannot be easily added to a storage OS that is built into a product or a hypervisor that virtualizes CPU hardware.

SUMMARY OF THE INVENTION

The present invention has been made in view of the above circumstances, and an object thereof is to provide a data processing device, a storage device, and a prefetch method capable of optimizing a prefetch control in accordance with a data pattern.

In order to achieve the above object, the data processing device according to a first aspect includes: a first storage unit; a second storage unit that has a larger capacity and a slower access speed than the first storage unit; a third storage unit that has a larger capacity than the first storage unit and a slower access speed than the second storage unit; a device driver configured to prefetch data stored in the third storage unit into the second storage unit and copy the prefetched data in the second storage unit to the first storage unit; and an inference unit that is provided outside the device driver. The device driver includes a first interface configured to receive an instruction of the prefetch from the inference unit, and a prefetch execution unit configured to execute the prefetch based on an instruction of the prefetch that is received by the first interface, and in which the inference unit configured to predict an address used to prefetch from the third storage unit, and instruct the prefetch in the device driver based on a prediction result.

According to the present invention, the prefetch control can be optimized according to the data pattern.

DESCRIPTION OF EMBODIMENTS

Embodiments will be described with reference to the drawings. The embodiments described below do not limit the invention according to the claims, and all of the elements described in the embodiments and combinations thereof are not necessarily essential to the solution of the invention.

Figure 1:
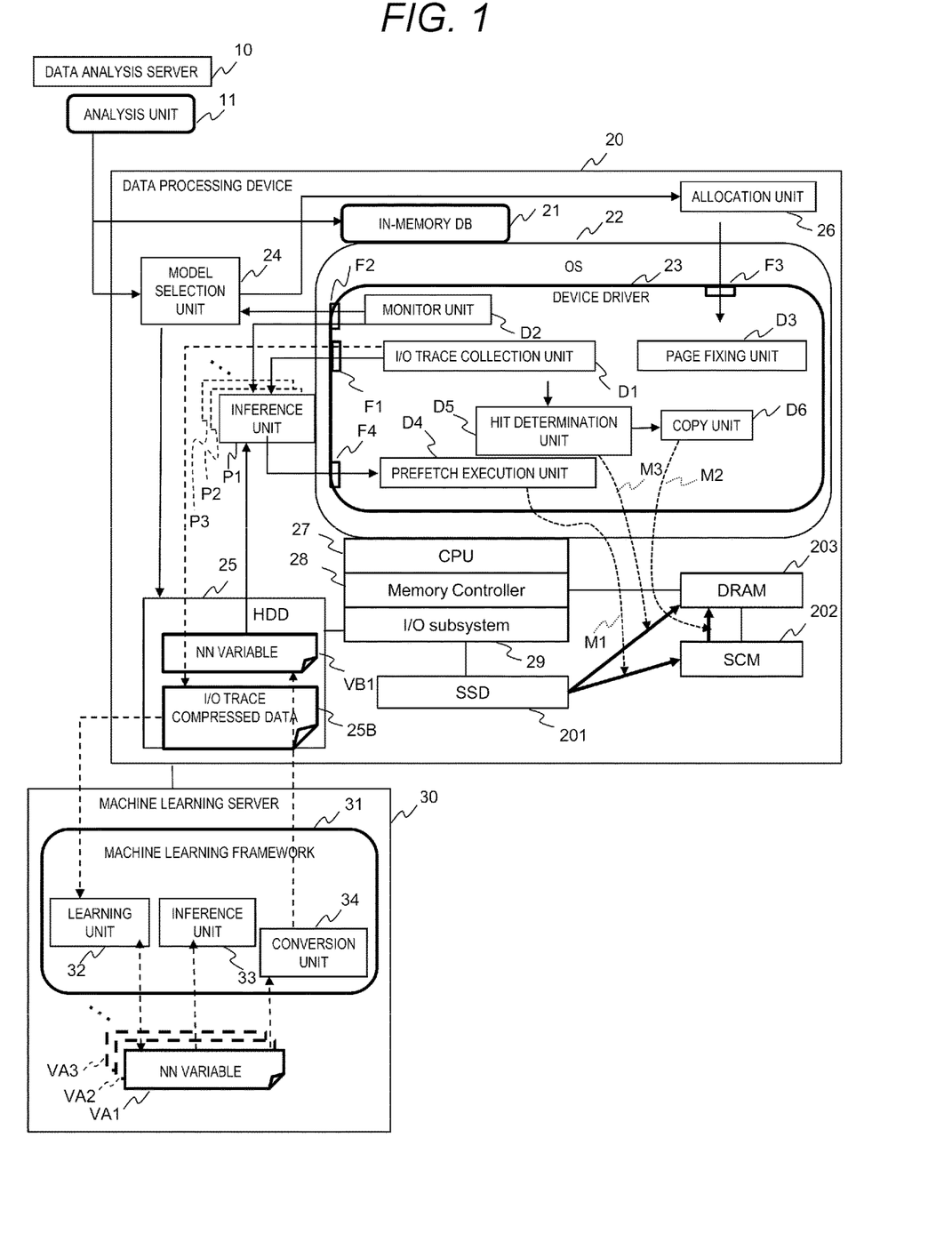
FIG. 1 is a block diagram illustrating a functional configuration of a data processing device according to a first embodiment.

FIG. 1 is a block diagram illustrating a configuration of a data processing device according to a first embodiment. In the following description, when "○○ unit" indicates an operation subject, it means that a Central Processing Unit (CPU) 27 reads out a ○○ unit, which is a program, from a hard disk drive (HDD) 25, and loads the ○○ unit into a DRAM 203, so as to realize the function of the ○○ unit.

In FIG. 1, a data analysis server 10 analyzes large scale data. The data analysis server 10 includes an analysis unit 11. The analysis unit 11 analyzes a query and outputs the query to a data processing device 20.

The data processing device 20 includes an in-memory database 21, a device driver 23, a model selection unit 24, an HDD 25, an allocation unit 26, an inference unit P1, a CPU 27, a memory controller 28, an Input/Output (I/O) subsystem 29, a Solid State Drive (SSD) 201, an SCM 202, and a DRAM 203.

The in-memory database 21 executes processing by arranging data in the SCM 202 and the DRAM 203. The in-memory database 21 stores the large scale data analyzed by the data analysis server 10.

The device driver 23 executes read/write processing of the SSD 201, and copies prefetched data in the SCM 202 to the DRAM 203. When the read/write processing of the SSD 201 is executed, the device driver 23 can conform to, for example, a non-volatile memory (NVM) Express. The device driver 23 is mounted on an operating system 22.

The CPU 27 is hardware that administrates an overall operation control of the data processing device 20. The memory controller 28 controls the operation of the DRAM 203 when the CPU 27 reads/writes data in the DRAM 203. The memory controller 28 may also be incorporated in the CPU 27. The I/O subsystem 29 manages input/output of data in the SSD 201. A PCI Express can be used for data transmission between the I/O subsystem 29 and the SSD 201.

The DRAM 203 can store a program being executed by the CPU 27, or provide a work area for the CPU 27 to execute the program. The DRAM 203 is used as a main memory of the CPU 27.

The SCM 202 is used to expand capacity of the main memory. The SCM 202 is a nonvolatile memory that can be accessed in a unit of byte through an interface the same as the DRAM 203. A prefetch buffer that temporarily holds data read from the SSD 201 can be allocated to the SCM 202. The SCM 202 can be used as a storage cache of the SSD 201. At this time, the SCM 202 can store data having a high use frequency of a scale that cannot be stored in the DRAM 203, and can be used at an access time smaller than that of the SSD 201. For example, the SCM 202 has a long life and a high speed of about 1000 times of the SSD 201, and can have a capacity of about 10 times of the DRAM 203.

The SCM 202 is, for example, a magnetoresistive memory (MRAM), a resistance change memory (ReRAM), a phase change memory (PRAM/PCM), a ferroelectric memory (FeRAM), a spin injection type magnetic memory (STT-MRAM), a carbon nanotube memory, or a 3D cross point memory.

Here, by using the SCM 202 as the prefetch buffer, it is possible to increase a prefetch region without increasing the capacity of the DRAM 203, and to improve the throughput of data processing of a scale that cannot be stored in the DRAM 203 while suppressing an increase in cost.

The SSD 201 is a storage device used as an auxiliary storage unit of the main memory. The SSD 201 stores data in an NAND flash memory. The NAND flash memory is a nonvolatile memory that can be read or written in a unit of page and can be erased in a unit of block.

The HDD 25 is used to expand a capacity of the auxiliary storage unit. The HDD 25 stores a Neural Network (NN) variable VB1 and I/O trace compressed data 25B. The NN variable VB1 can be used to configure the inference unit P1 in a neural network. The NN variable VB1 can be stored in, for example, a Comma Separated Value (CSV) file. The I/O trace compressed data 25B is data obtained by compressing I/O trace data. The I/O trace data is data used for past reading or writing with regard to the DRAM 203. As an attribute of the I/O trace data, for example, a time point, a block address, a block number, and a read/write type are recorded.

Each of inference units P1 to P3 . . . predicts an address used in prefetching from the SSD 201, and instructs the device driver 23 to prefetch from an outside based on a prediction result thereof. At this time, each of the inference units P1 to P3 . . . designates a source address and a destination address, and instructs a prefetch. The source address is an address of the SSD 201 in which data to be prefetched is stored. The destination address is an address of the SCM 202 in which data to be prefetched is stored.

Each of the inference units P1 to P3 . . . has a different prediction model or an algorithm according to a data pattern of the I/O trace data. The prediction model or the algorithm included in each of the inference units P1 to P3 . . . can be constructed such that data with high access frequency can be predicted according to the data pattern of the I/O trace data. For example, when each of the inference units P1 to P3 . . . is a neural network, it is possible to use a learned model in which learning is performed such that data with high access frequency can be predicted according to the data pattern of the I/O trace data. Each of the inference units P1 to P3 . . . can associate a query used in the data analysis server 10 with a database.

Each of the inference units P1 to P3 . . . acquires performance information from the device driver 23, and can instruct to postpone the prefetch when a usage rate of an I/O band used for the prefetch exceeds a threshold. Accordingly, an occupation of the I/O band according to the prefetch can be avoided, and replacement of prefetch data can be executed based on a prediction at an appropriate timing.

Each of the inference units P1 to P3 . . . may also include a prediction model that predicts the usage rate of an I/O band used for the prefetch in addition to a prediction model that predicts an address to be prefetched from the SSD 201. At this time, each of the inference units P1 to P3 . . . may also determines the timing of the prefetch based on the usage rate of the I/O band predicted by the prediction model.

The allocation unit 26 is provided outside the device driver 23, and allocates a prefetch buffer for temporarily holding data read from the SSD 201 to the SCM 202. At this time, the allocation unit 26 can notify the device driver 23 of the number of divided buffer areas and the size of the optimized prefetch buffer with regard to the address prediction according to each of the inference units P1 to P3 . . . from outside.

The model selection unit 24 selects each of the inference units P1 to P3 . . . from the outside of the device driver 23 and arranges the inference units P1 to P3 outside the device driver 23. At this time, the model selection unit 24 can select the inference units P1 to P3 . . . associated with a query that matches or has a high degree of similarity with the query that is being executed given from the in-memory database 21. Therefore, the model selection unit 24 can replace each of the inference units P1 to P3 . . . such that prediction accuracy increases according to a type of data analysis or the like.

In addition, the model selection unit 24 acquires performance information such as a hit rate of the prefetch, and can replace each of the inference units P1 to P3 . . . based on the performance information. For example, when the hit rate of the prefetch is low, the model selection unit 24 can improve the hit rate of the prefetch by replacing each of the inference units P1 to P3 . . . . In addition, when the additional learning of the neural network is performed, for example, as the inference unit P1, the neural network before the additional learning can be replaced with an additional learned neural network, and the prediction accuracy of the inference unit P1 can be improved.

The device driver 23 includes an I/O trace collection unit D1, a monitor unit D2, a page fixing unit D3, a prefetch execution unit D4, a hit determination unit D5, a copy unit D6, and interfaces F1 to F4.

The I/O trace collection unit D1 collects the I/O trace data. The monitor unit D2 monitors I/O traffic including the prefetch and acquires the performance information such as the hit rate of the prefetch.

The page fixing unit D3 fixes pages of the prefetch buffer allocated to the SCM 202. At this time, the page fixing unit D3 can divide the storage region of the SCM 202 in an unit of size (for example, 128 KB) in which a read performance of the SSD 201 is maximized, and configure a prefetch buffer having a variable size by using the unit as a bundle. Accordingly, the page fixing unit D3 can change the number of divided buffer areas and the size of the prefetch buffer according to the query and the structure of the neural network associated with the database, and it is possible to improve the hit rate of the prefetch data. Here, the page fixing unit D3 can prevent paging of the prefetch buffer by fixing the pages of the prefetch buffer.

The prefetch execution unit D4 executes prefetch for the storage cache allocated to the SCM 202 based on the prediction by each of the inference units P1 to P3 . . . associated with the query and the database (M1).

The hit determination unit D5 determines the access to the SSD 201 corresponding to the buffer region in which the prefetch is successful. Then, if there is no hit, the hit determination unit D5 reads the data that has a read request from the SSD 201 and writes the read data to the DRAM 203 (M3).

When a hit is determined in the hit determination unit D5, the copy unit D6 memory copies the prefetch data of the SCM 202 to the DRAM 203 (M2), and executes a completion processing of the I/O request. In the memory copy, for example, a memcpy function described in C language can be used. At this time, the memory copy is copied from a head address of the copy source to a copy destination only by a designated number of bytes.

When a hit occurs, the copy unit D6 does not need to issue a command to the SSD 201 by memory copying the prefetch data of the SCM 202 to the DRAM 203, thereby improving the prefetch performance. In addition, in the memory copy, data can be copied in a unit of byte at a Double-Data-Rate (DDR), and throughput and latency can be improved as compared with the read/write from the SSD 201.

The interface F1 provides the I/O trace data collected by the I/O trace collection unit D1 to the outside of the device driver 23. The interface F2 provides the performance information related to the prefetch acquired by the monitor unit D2 to the outside. The interface F3 notifies the page fixing unit D3 of an instruction from the allocation unit 26. The interface F4 notifies the prefetch execution unit D4 of a prefetch instruction from each of the inference units P1 to P3 . . . .

A machine learning server 30 creates a machine learning prediction model. The machine learning server 30 includes a machine learning framework 31. The machine learning framework 31 is a software library for use in machine learning. The machine learning framework 31 can use, for example, a tensor flow.

The machine learning framework 31 includes a learning unit 32, an inference unit 33, and a conversion unit 34. The learning unit 32 causes the neural network to learn based on the I/O trace data during execution of the data analysis by the device driver 23, and obtains NN variables VA1 to VA3 . . . . At this time, the learning data used for the learning of the neural network is associated with the query and the database. Then, the learning unit 32 obtains the NN variables VA1 to VA3 . . . such that data with high access frequency can be predicted for each query and each database. Further, the learning unit 32 can select a neural network to additionally learn based on the similarity between the query and the database.

The inference unit 33 predicts data having high access frequency as a prediction model of a neural network generated based on the NN variables VA1 to VA3 . . . . The conversion unit 34 converts a data format of the NN variables VA1 to VA3 . . . from the data format handled by the machine learning framework 31 into a data format handled by the data processing device 20.

As a prefetch processing procedure, in an SSD initialization processing, the device driver 23 ensures a region of a submit queue and a completion queue dedicated to prefetch and performs setting of a simplified SSD read completion processing that does not cause an interruption.

When the inference unit P1 is selected according to the query and the database, the model selection unit 24 reads a learned NN variable VB1 corresponding to the inference unit P1, and the inference unit P1 sets a position and size of the block address region of the SSD 201 to be predicted in the device driver 23. Then, the device driver 23 allocates a prefetch buffer to the SCM 202, generates a read/write command of the SSD 201 dedicated to the prefetch in advance, and executes a page fixing processing.

The device driver 23 traces an I/O request with regard to the SSD 201, and holds a constant of past I/O trace data. The inference unit P1 requests the device driver 23 to acquire the number of data that the prediction model requires as input, and predicts the access frequency of the block address region of the SSD 201. At this time, the inference unit P1 can adjust the timing so as to perform inference and prefetch when a usage rate of the I/O band is low enough by acquiring the I/O traffic information including the information according to the prefetch monitored by the device driver 23 in advance.

It can be optimized for each prediction model that the data should be read from which block address region of the SSD 201 to where of the prefetch buffer according to the type of data analysis and the like based on an order of the predicted access frequency. Therefore, by mounting the prediction model to the outside of the operating system 22, it is possible to switch the prediction model without replacing the operating system 22. On the other hand, by mounting the prefetch execution unit D4 in the operating system 22, the prefetch mechanism can be held at the platform level. Therefore, it is not necessary to mount a separate prefetch mechanism in a plurality of databases corresponding to the data format, and mounting of the prefetch mechanism can be made efficient.

The device driver 23 determines the access to the SSD 201 corresponding to the prefetch buffer region in which the prefetch is successful, and when a hit occurs, the device driver executes a memory copy of the prefetch data and the completion processing of the I/O request. At this time, the device driver 23 can copy the prefetch data of the SCM 202 to the DRAM 203 without issuing a read/write command to the SSD 201, and improve the access performance.

Figure 2:
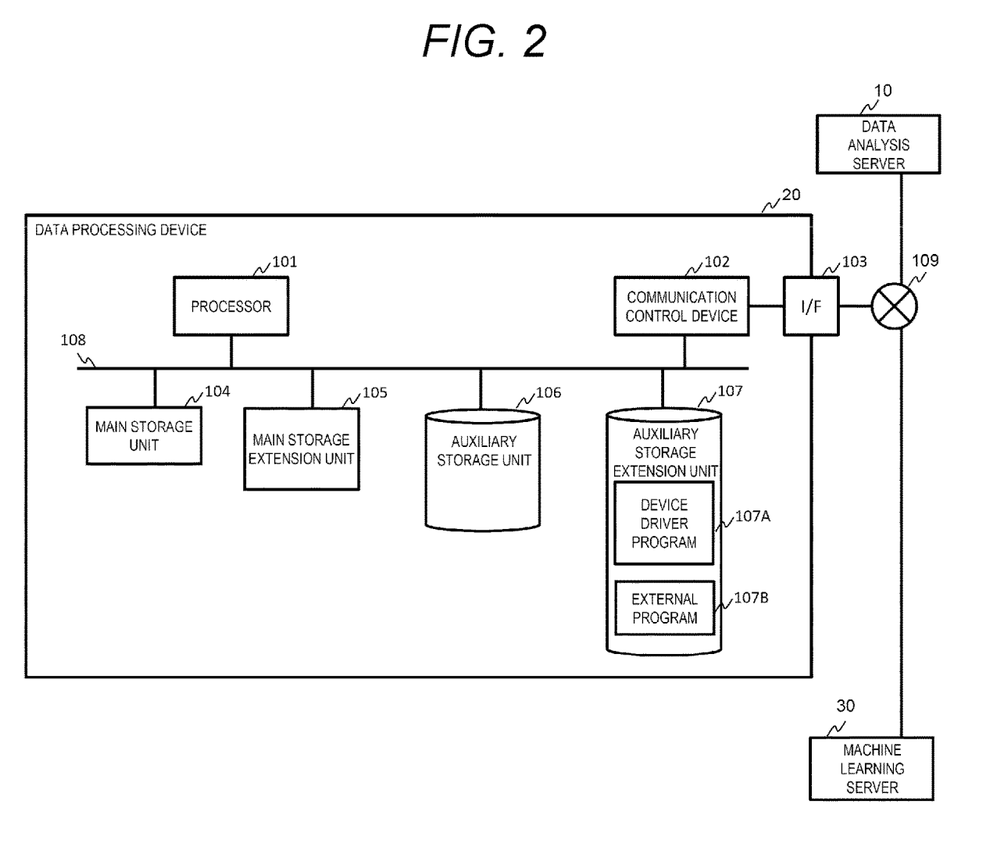
FIG. 2 is a block diagram illustrating a hardware configuration example of the data processing device of FIG. 1.

FIG. 2 is a block diagram illustrating a hardware configuration example of the data processing device of FIG. 1.

In FIG. 2, the data processing device 20 includes a processor 101, a communication control device 102, a communication interface 103, a main storage unit 104, a main storage extension unit 105, an auxiliary storage unit 106, and an auxiliary storage extension unit 107. The processor 101, the communication control device 102, the communication interface 103, the main storage unit 104, the main storage extension unit 105, the auxiliary storage unit 106, and the auxiliary storage extension unit 107 are connected to each other via an internal bus 108.

The processor 101 is hardware that administrates the overall operation control of the data processing device 20. The processor 101 may be a CPU or a Graphics Processing Unit (GPU). The processor 101 may be a single core processor or a multi-core processor. The processor 101 may include a hardware circuit (for example, a Field-Programmable Gate Array (FPGA) or an Application Specific Integrated Circuit (ASIC)) that performs some or all of the processing. The processor 101 may include the neural network.

The main storage unit 104 can be configured with, for example, a volatile semiconductor memory such as an SRAM or a DRAM. In the main storage unit 104, a program being executed by the processor 101 may be stored, or a work area for the processor 101 to execute the program may be provided.

The main storage expansion unit 105 expands a capacity of the main storage unit 104. The main storage expansion unit 105 can be configured with a nonvolatile semiconductor memory such as an SCM. The main storage expansion unit 105 can be used as the storage cache of the auxiliary storage unit 106. The capacity of the main storage expansion unit 105 is larger than the capacity of the main storage unit 104. An access speed of the main storage expansion unit 105 is faster than the access speed of the auxiliary storage unit 106.

The auxiliary storage unit 106 can be configured with a nonvolatile semiconductor memory having a large storage capacity. The auxiliary storage unit 106 is, for example, a storage device such as the SSD. The auxiliary storage unit 106 can lower the cost per unit capacity as compared with the main storage expansion unit 105.

The auxiliary storage extension unit 107 expands the capacity of the auxiliary storage unit 106. The auxiliary storage unit 106 is, for example, a storage device such as an HDD. The auxiliary storage extension unit 107 can lower the cost per unit capacity than that of the auxiliary storage unit 106. The auxiliary storage extension unit 107 can hold executable files of various programs and data used for executing the program. The auxiliary storage extension unit 107 can store a device driver program 107A and an external program 107B.

The device driver program 107A is a program that operates on the operating system. The external program 107B is a program that operates outside the operating system. The device driver program 107A and the external program 107B may be softwares that can be installed in the data processing device 20, or may also be incorporated in the data processing device 20 as a firmware.

The communication control device 102 is hardware that has a function of controlling communication with the outside. The communication control device 102 is connected to the network 109 via the communication interface 103. The network 109 may be a Wide Area Network (WAN) such as an Internet, may also be a Local Area Network (LAN) such as a WiFi or an Ethernet (registered trademark), or may also be a combination of the WAN and the LAN. In addition, the data analysis server 10 and the machine learning server 30 are connected to the network 109.

The processor 101 reads the device driver program 107A into the main storage unit 104, and the device driver program 107A is executed so as to realize a function of the device driver 23 in FIG. 1. In addition, the functions of the model selection unit 24, the inference unit P1, and the allocation unit 26 of FIG. 1 can be realized by the processor 101 that reads the external program 107B to the main storage unit 104 and executes the external program 107B.

Figure 3:
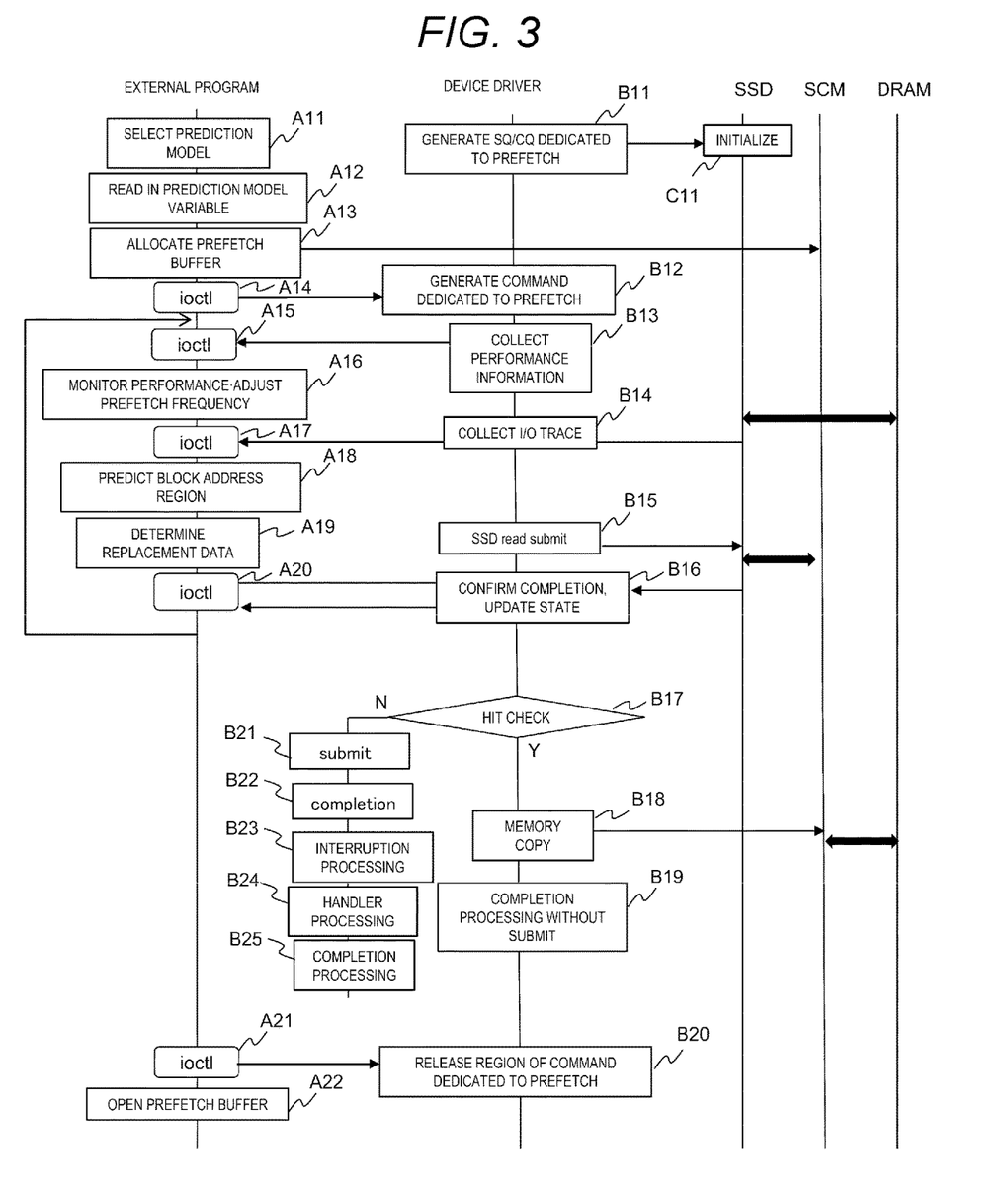
FIG. 3 is a diagram illustrating a flow of a cooperative processing between a device driver and an external program of FIG. 1.

FIG. 3 is a diagram illustrating a flow of a cooperative processing between the device driver and the external program of FIG. 1.

In FIG. 3, as the initialization processing of the SSD 201 in FIG. 1, the device driver 23 creates the submit queue and the completion queue dedicated to the prefetch in the DRAM 203 (B11), and initializes the SSD 201 (C11). In the initialization of the SSD 201, for example, when a read/write completion notification is entered in the completion queue, it is set which function is called and the like. The submit queue holds a read/write request command to the SSD 201. The completion queue holds a read/write completion notification from the SSD 201. The read/write completion notification can include a normal termination notification or an abnormal termination notification of the read/write.

The external program installed outside the operating system takes in the prediction model and the variable used as the inference unit P1 in FIG. 1 from the outside to the data processing device 20 (A11 and A12), and allocates the prefetch buffer to the SCM 202 (A13). The processing according to the external program is realized by the CPU 27 of FIG. 1 to execute the external program.

Next, the external program executes an ioctl of command generation (A14). The ioctl is a system call for the external program to control the device driver 23 and to communicate with the device driver 23. At this time, the external program can call the interface of the device driver 23 and execute the function having an argument set therein. When the ioctl of the command generation is executed, the device driver 23 generates a read/write command of the SSD 201 dedicated to the prefetch (B12).

Next, the external program executes an ioctl of a performance information collection (A15). When the ioctl of the performance information collection is executed, the device driver 23 collects the performance information on the prefetch and transmits the information to the external program (B13). Next, the external program monitors the prefetch performance based on the performance information and adjusts a prefetch frequency (A16).

Next, the external program executes an ioctl of an I/O trace collection (A17). When the ioctl of the I/O trace collection is executed, the device driver 23 collects the I/O trace data and transmits the data to the external program (B14). Next, the external program predicts the block address region based on the I/O trace data (A18), and determines a replacement data to be replaced in the prefetch buffer (A19).

Next, the external program executes an ioctl of the read submit (A17). When the ioctl of the read submit is executed, the device driver 23 executes the submit of a read command of the SSD 201 (B15). Next, the device driver 23 checks the read completion of the SSD 201 sent from the SSD 201, updates the state of the prefetch buffer, and notifies the external program (B16).

The external program repeats the processing of A15 to A20 each time the read completion of the SSD 201 is notified. At this time, the device driver 23 updates the state of the prefetch buffer each time the read/write command of the SSD 201 dedicated to the prefetch is submitted and the completion thereof is confirmed.

Next, the device driver 23 determines the access to the SSD 201 corresponding to the buffer region in which the prefetch is successful (B17). Further, when a hit occurs, the device driver 23 memory copies the prefetch data of the SCM 202 to the DRAM 203 (B18), and executes the I/O request completion processing without the submit (B19).

Next, the external program executes an ioctl of command region releasing (A21). When the ioctl of the command region releasing is executed, the device driver 23 releases the region of the read/write command of the SSD 201 dedicated to the prefetch. Next, the external program releases the prefetch buffer allocated to the SCM 202.

Here, in the prefetch processing using the command queue and the completion notification queue dedicated for prefetch, the number of the device driver 23 is only a number that has submitted to the command queue, when the normal completion notification from the SSD 201 is set in the completion notification queue, the read processing from the SSD 201 can be completed, and the prefetch processing can be simplified so that the overhead of the prefetch can be reduced.

On the other hand, when there is no hit in a hit check of B17, the device driver 23 executes normal prefetch involving an interruption handler processing. At this time, the device driver 23 performs a submit to the SSD 201 (B21), and when a read completion notification from the SSD 201 exists (B22), the device driver 23 executes interruption processing (B23). Next, after executing the handler processing (B24), the device driver 23 executes the completion processing (B25).

At this time of page fixing of the prefetch buffer, the external program can call an following ioctl function in which a pointer to the structure body is set as an argument.

```
struct prfbf_user_pg{
    int hmx_num_du;//the number of divided buffer areas of prefetch buffer
    int lba_int_du;//the size of divided buffer area of prefetch buffer
    void **prfbf_du;//array of prefetch buffer virtual address
};
```

At this time of the SSD region to be prefetched is designated, the external program can call an following ioctl function in which the pointer to the structure body is set as an argument.

```
struct prflba_param{
    long prfssd_addr;//position of SSD region to be prefetched
};
```

At this time of acquiring the I/O trace data, the external program can call an following ioctl function in which the pointer to the structure body is set as an argument.

```
struct trdtbf_user{
    int mxln_du;//the number of I/O trace to be acquired
    long *trdbf_du;//I/O trace data length
};
```

At this time of prefetch execution, the device driver 23 can execute an following ioctl function in which the pointer to the structure body is set as an argument.

```
struct subprf_user{
    int src_du;//SSD high frequency access region divided region number
    int dest_du;//divided allocated prefetch buffer number
};
```

At this time of acquiring a performance monitor data, the external program can call an following ioctl function in which the pointer to the structure body is set as an argument.

```
struct dbgdtbf_user{
    int mxln_du;//the number of performance monitor data to be acquired
    long *dbgbf_du;//performance monitor data length
};
```

Figure 4:
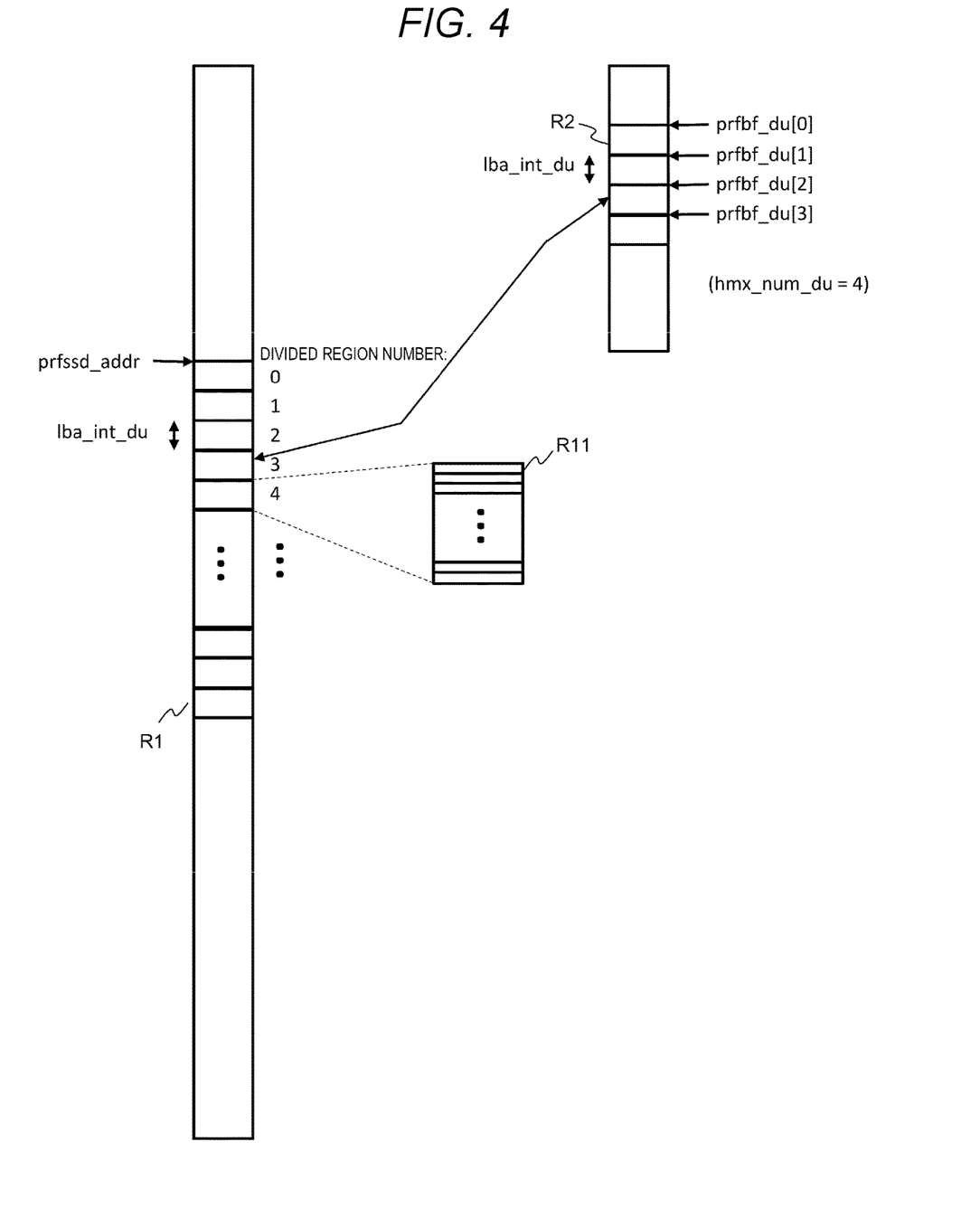
FIG. 4 is a diagram illustrating a relationship between a storage region of an SSD and a storage region of an SCM to be prefetched in FIG. 1.

FIG. 4 is a diagram illustrating a relationship between a storage region of an SSD and a storage region of a SCM to be prefetched in FIG. 1.

In FIG. 4, the position prfssd_addr of the SSD region to be prefetched is set in the prefetch target region R1 of the SSD 201, and is divided by the prefetch buffer size lba_int_du. Each divided region of the SSD 201 is assigned a divided region number. A block address is allocated to the storage region of the SSD 201.

A prefetch region R2 of SCM 202 divides the prefetch buffer size lba_int_du, and only the number of divided buffer areas of lba_int_du is allocated. FIG. 4 shows an example of the number of divided buffer areas of hmx_num_du=4. The virtual address prfbf_du is allocated to each divided buffer area of the prefetch region R2. The device driver 23 of FIG. 1 can convert the divided region number of each divided region of the SSD 201 into the virtual address of each divided buffer area of the prefetch region R2.

prf_dt[i], prfsv_dt[i], and prfdrt_dt[i] can be set in a state variable array [hmx_num_du] of each divided buffer area of the prefetch buffer.

In which, i is a number for each divided buffer area of the prefetch buffer, prf_dt[i] is a number of prefetched SSD division region, prfsv_dt[i] is a number of commands illustrating that the read of the SSD 201 is normally completed, and prfdrt_dt[i] is a bitmap illustrating a dirty state.

Each divided region of the SSD 201 can be re-divided in units of data sizes in which sequential read performance is high. The data size of a re-divided region R11 can be set as a fixed value. Further, the number of divided buffer areas and the size of the prefetch buffer can be set variable by configuring the re-division region R11 with divided regions as bundles and setting the re-division region R11 included in each divided region to be variable.

Here, when the size of the prefetch buffer increases, it is necessary to prefetch data predicted to a far future, and the hit rate decreases. When the size of the prefetch buffer decreases, the data to be predicted increases, and the hit rate decreases. Therefore, the size of the prefetch buffer is an optimum size that maximizes the hit rate, and the size of the prefetch buffer can be optimized by setting the size of the prefetch buffer variable.

At this time, the optimal size for prediction changes according to the data pattern of the I/O trace data. Therefore, the size and the number of divided buffer areas of the prefetch buffer optimal for the prediction model can be learned with respect to the prediction model constructed so that data with high access frequency can be predicted according to the data pattern of the I/O trace data. Then, the device driver 23 of FIG. 1 can set the prefetch region R2 of the SCM 202 based on the size and the number of divided buffer areas of the prefetch buffer that is optimal for the prediction model.

Figure 5:
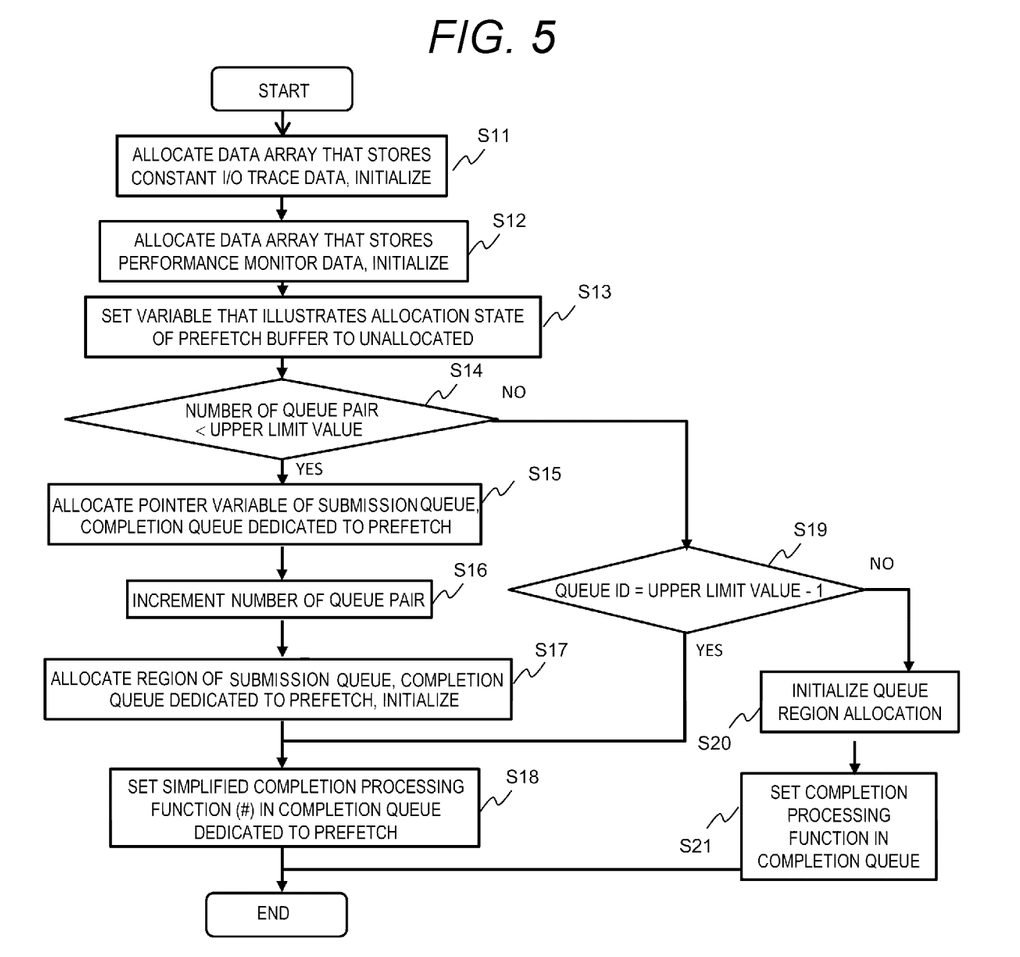
FIG. 5 is a flowchart illustrating an initialization processing by the device driver of FIG. 1.

FIG. 5 is a flowchart illustrating an initialization processing by the device driver of FIG. 1.

In FIG. 5, the device driver 23 allocates a data array that stores a constant of I/O trace data to the DRAM 203 and initializes the data array (S11). Next, the device driver 23 allocates the data array that stores the performance monitor data related to the prefetch to the DRAM 203 and initializes the data array (S12). Next, the device driver 23 sets a variable that illustrates the allocation state of the prefetch buffer to unallocated (S13).

Next, the device driver 23 determines whether the number of pairs of the submit queue and the completion queue created independently of the prefetch is smaller than the upper limit value of the system (S14). When the number of pairs of the submit queue and the completion queue created independently of the prefetch is smaller than the upper limit value, the device driver 23 allocates a pointer variable of a submit queue and a completion queue dedicated to the prefetch (S15).

Next, the device driver 23 increments the number of pairs of the submit queue and the completion queue (S16). Next, the device driver 23 allocates the region of the submit queue and the completion queue dedicated to prefetch to the DRAM 203 (S17) and initializes the region. Next, the device driver 23 sets a simplified completion processing function (#) without interruption handler processing in a completion queue dedicated to prefetch (S18). The completion processing function (#) executes only the confirmation of the completion state and an update of a head pointer.

On the other hand, when the number of pairs of the submit queue and the completion queue created independently of the prefetch is equal to or larger than the upper limit value, the device driver 23 uses the submit queue and the completion queue with upper limit value of queue ID of −1 in prefetching (S19). When the queue ID of the submit queue and the completion queue is the upper limit value −1, the device driver 23 proceeds to S18.

On the other hand, when the queue ID of the submit queue and the completion queue is not the upper limit value −1, the device driver 23 initializes the region allocation of the submit queue and the completion queue dedicated to prefetch (S20). Next, the device driver 23 sets a completion processing function in the completion queue (S21).

Figure 6:
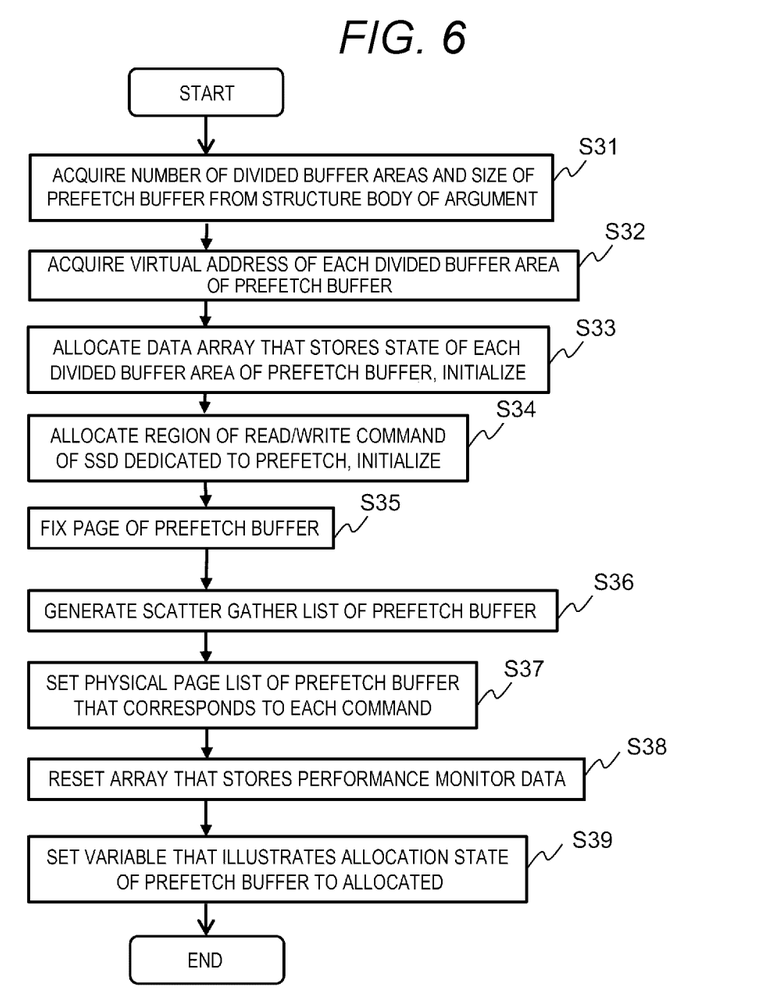
FIG. 6 is a flowchart illustrating page fixing processing by the device driver of FIG. 1.

FIG. 6 is a flowchart illustrating the page fixing processing by the device driver of FIG. 1.

In FIG. 6, the page fixing unit D3 of FIG. 1 acquires the number of divided buffer areas and size of the prefetch buffer from the structure body of the argument (S31). The structure body of the argument is defined by struct prfb-f_user_pg described above.

Next, the page fixing unit D3 acquires the virtual address of each divided buffer area of the prefetch buffer (S32). Next, the page fixing unit D3 allocates a data array that stores the state of each divided buffer area of the prefetch buffer to the DRAM 203 and initializes the data array (S33). The state of each divided buffer area of the prefetch buffer is, for example, during prefetching, prefetched or dirty during writing.

Next, the page fixing unit D3 allocates the region of the read/write command of the SSD 201 dedicated to prefetch to the DRAM 203, and initializes the region (S34). Next, the page fixing unit D3 page fixes the prefetch buffer to the SCM 202 (S35). At this time, as the prefetch buffer, the region of size×the number of divided buffer areas acquired in S31 is set in the SCM 202. Here, by page fixing the prefetch buffer, it is possible to prevent page out in the auxiliary storage device when the memory is depleted.

Next, the page fixing unit D3 creates a scatter gather list of the prefetch buffer (S36). The scatter gather list is a physical page list of the prefetch buffer.

Next, the page fixing unit D3 sets the physical page list of the prefetch buffer corresponding to the read/write command of the SSD 201 dedicated to prefetch in the DRAM 203 (S37). The physical page list can illustrate the storage location of the read/write command of the SSD 201.

Next, the page fixing unit D3 resets the data array in which the performance monitor data related to the prefetch is stored (S38). Next, the page fixing unit D3 sets a variable illustrating the allocation state of the prefetch buffer to allocated (S39).

Figure 7:
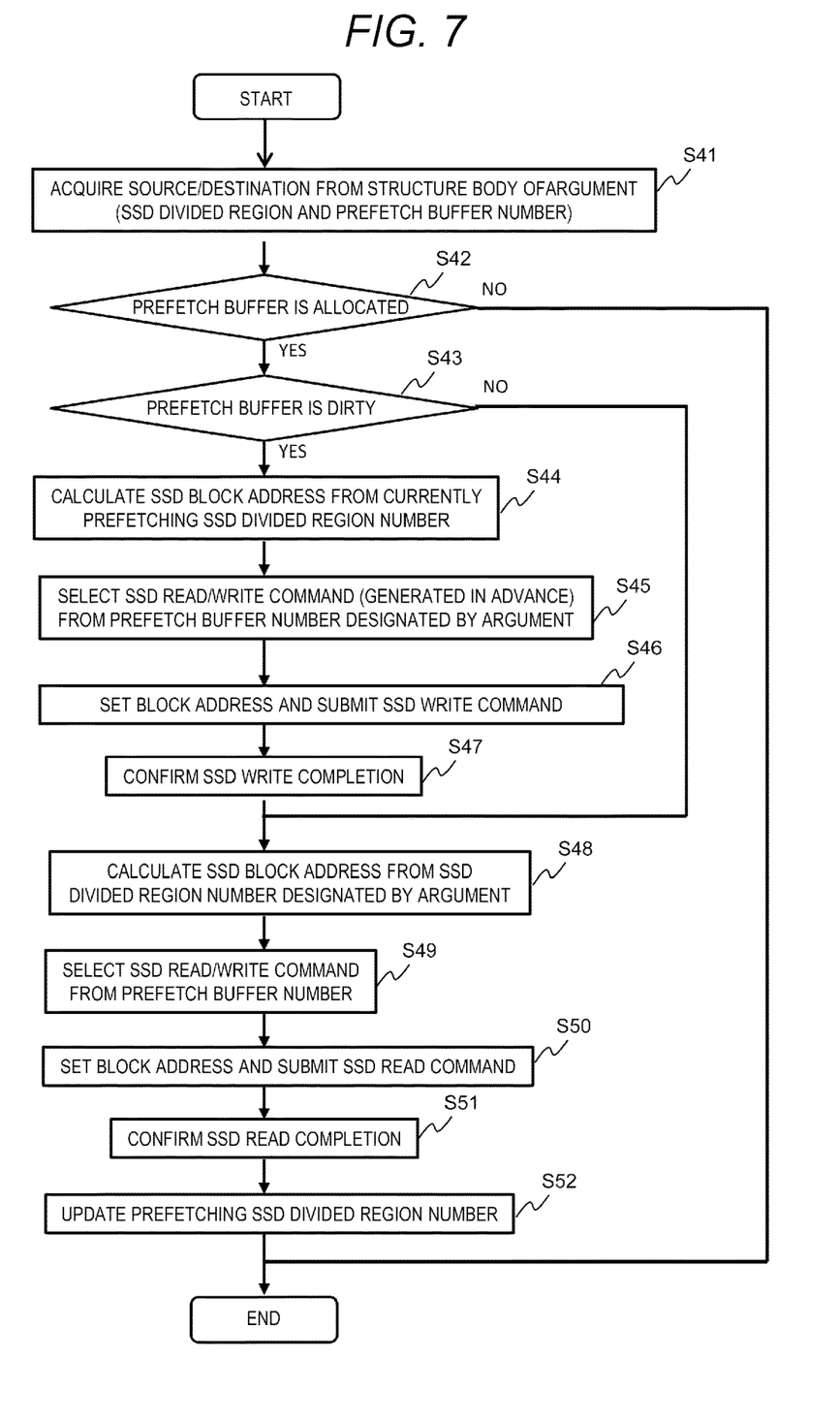
FIG. 7 is a flowchart illustrating prefetch execution processing by the device driver of FIG. 1.

FIG. 7 is a flowchart illustrating prefetch execution processing by the device driver of FIG. 1.

In FIG. 7, the prefetch execution unit D4 of FIG. 1 acquires the source address and the destination address from the structure body of the argument (S41). The structure body of the argument is defined by struct subprf_user described above.

Next, the prefetch execution unit D4 determines whether the prefetch buffer is allocated (S42). When the prefetch buffer is not allocated, the processing ends. On the other hand, when the prefetch buffer is allocated, the prefetch execution unit D4 determines whether the prefetch buffer is dirty (S43). The prefetch buffer is dirty means that the prefetch data stored in the prefetch buffer does not match the data of the SSD 201 of the prefetch source. When data other than the prefetch data is written into the prefetch buffer, the prefetch buffer becomes dirty.

Next, when the prefetch buffer is dirty, the prefetch execution unit D4 calculates the block address of the SSD 201 from the divided region number of the divided region of the currently prefetching SSD 201 (S44). Next, the prefetch execution unit D4 selects the read/write command of the SSD 201 dedicated to prefetch created in advance from the prefetch buffer number designated by the argument acquired in S41 (S45).

Next, the prefetch execution unit D4 sets the block address calculated in S44 and submits the write command of the SSD 201 (S46). Next, the prefetch execution unit D4 confirms the write completion of the SSD 201 sent from the SSD 201 (S47). When the prefetch buffer is dirty, the data written in the prefetch buffer can be written back to the SSD 201 according to the processes S44 to S47.

Next, the prefetch execution unit D4 calculates the block address of the SSD 201 from the divided region number of the divided region of the SSD 201 designated by the argument acquired in S41 (S48). Next, the prefetch execution unit D4 selects the read/write command of the SSD 201 dedicated to prefetch from the prefetch buffer number designated by the argument acquired in S41 (S49).

Next, the prefetch execution unit D4 sets the block address calculated in S48 and submits the read command of the SSD 201 (S50). Next, the prefetch execution unit D4 confirms the read completion of the SSD 201 sent from the SSD 201 (S51). Next, the prefetch execution unit D4 updates the divided region number of the divided region of the prefetching SSD 201 (S52). According to the processes S48 to S52, new replacement data can be read from the SSD 201 and overwritten to the prefetch buffer.

On the other hand, if the prefetch buffer is not dirty in S43, the prefetch execution unit D4 skips the processes S44 to S47 and proceeds to S48.

The prefetch execution unit D4 updates the state of the prefetch buffer each time the read/write command of the SSD 201 dedicated to the prefetch is submitted and the completion thereof is confirmed.

Figure 8:
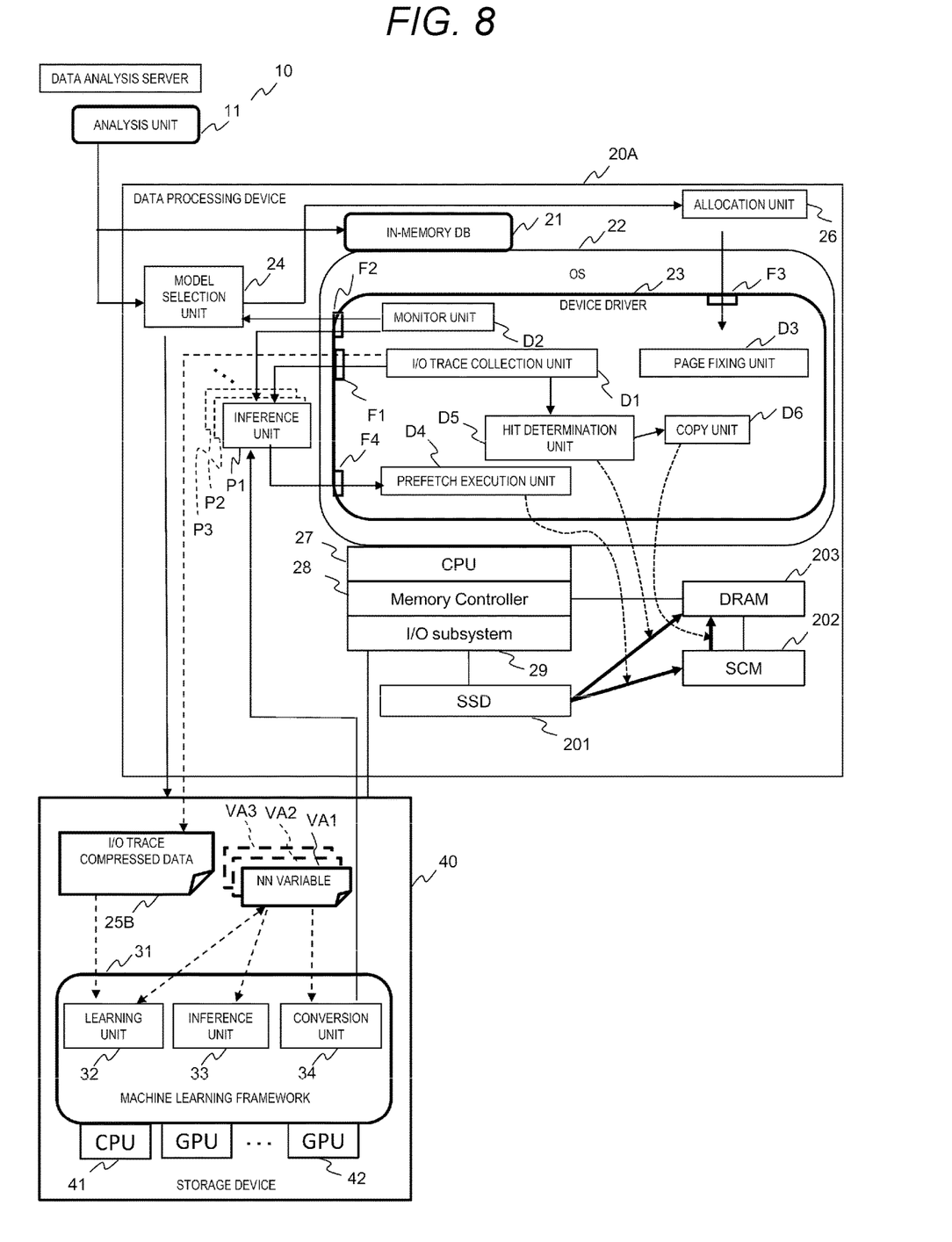
FIG. 8 is a block diagram illustrating a functional configuration of a data processing device according to a second embodiment.

FIG. 8 is a block diagram illustrating a functional configuration of a data processing device according to a second embodiment.

In FIG. 8, the HDD 25 of FIG. 1 is removed from the data processing device 20A. The data processing device 20A is connected to the data analysis server 10 and the storage device 40. Other configurations of the data processing device 20A are the same as those of the data processing device 20 of FIG. 1.

The storage device 40 has the same configuration as that of the machine learning server 30 of FIG. 1, and holds the I/O trace compressed data 25B. In addition, the storage device 40 includes a CPU 41 and a GPU 42.

In the configuration of FIG. 1, the data processing device 20 holds the I/O trace compressed data 25B, whereas in the configuration of FIG. 8, the storage device 40 holds the I/O trace compressed data 25B. Otherwise, the data processing device 20A operates in the same manner as the data processing device 20, and the storage device 40 operates in the same manner as the machine learning server 30.

Accordingly, the data processing device 20A does not need to hold the I/O trace compressed data 25B, and the scale of the data processing device 20A can be reduced as compared with the data processing device 20.

Figure 9:
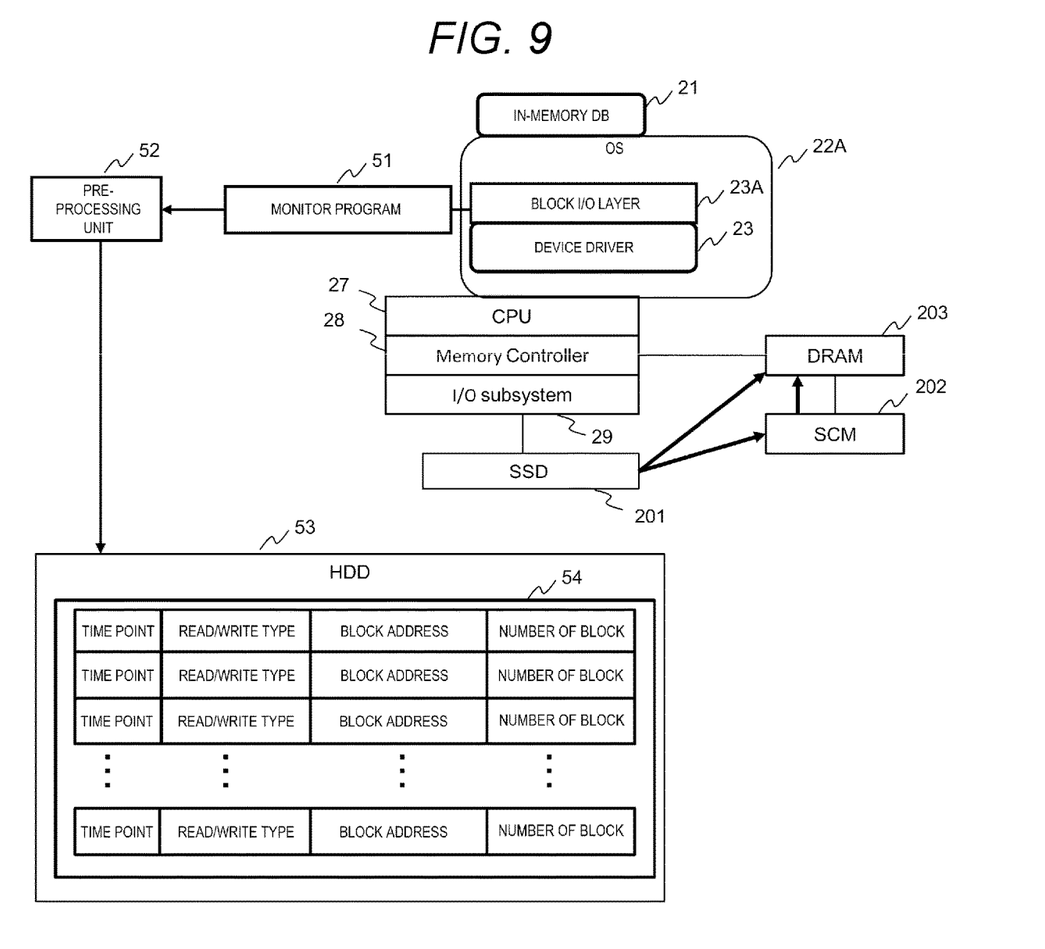
FIG. 9 is a block diagram illustrating a functional configuration of a data processing device according to a third embodiment.

FIG. 9 is a block diagram illustrating a functional configuration of a data processing device according to a third embodiment.

In FIG. 9, the data processing device includes an operating system 22A in place of the operating system 22 of FIG. 1. The operating system 22A includes a block I/O layer 23A in addition to the device driver 23. The block I/O layer 23A performs a read or write request to the device driver 23.

The monitor program 51 acquires the I/O trace data by monitoring the operation of the block I/O layer 23A. A pre-processing unit 52 processes a four-dimensional vector {time point, read/write type, block address, the number of block} included in the I/O trace data in a tensor format data 54 that is recorded as time series data only by a constant, and stores the processed vector in the HDD 53.

Accordingly, the I/O trace data can be collected in the upper layer of the device driver 23, and flexibility of collection, storage, and management of the I/O trace data can be improved. Further, by processing the I/O trace data into tensor format data 54, it is possible to efficiently read I/O trace data used for machine learning that is generally handled as a multi-dimensional tensor.

Figure 10:
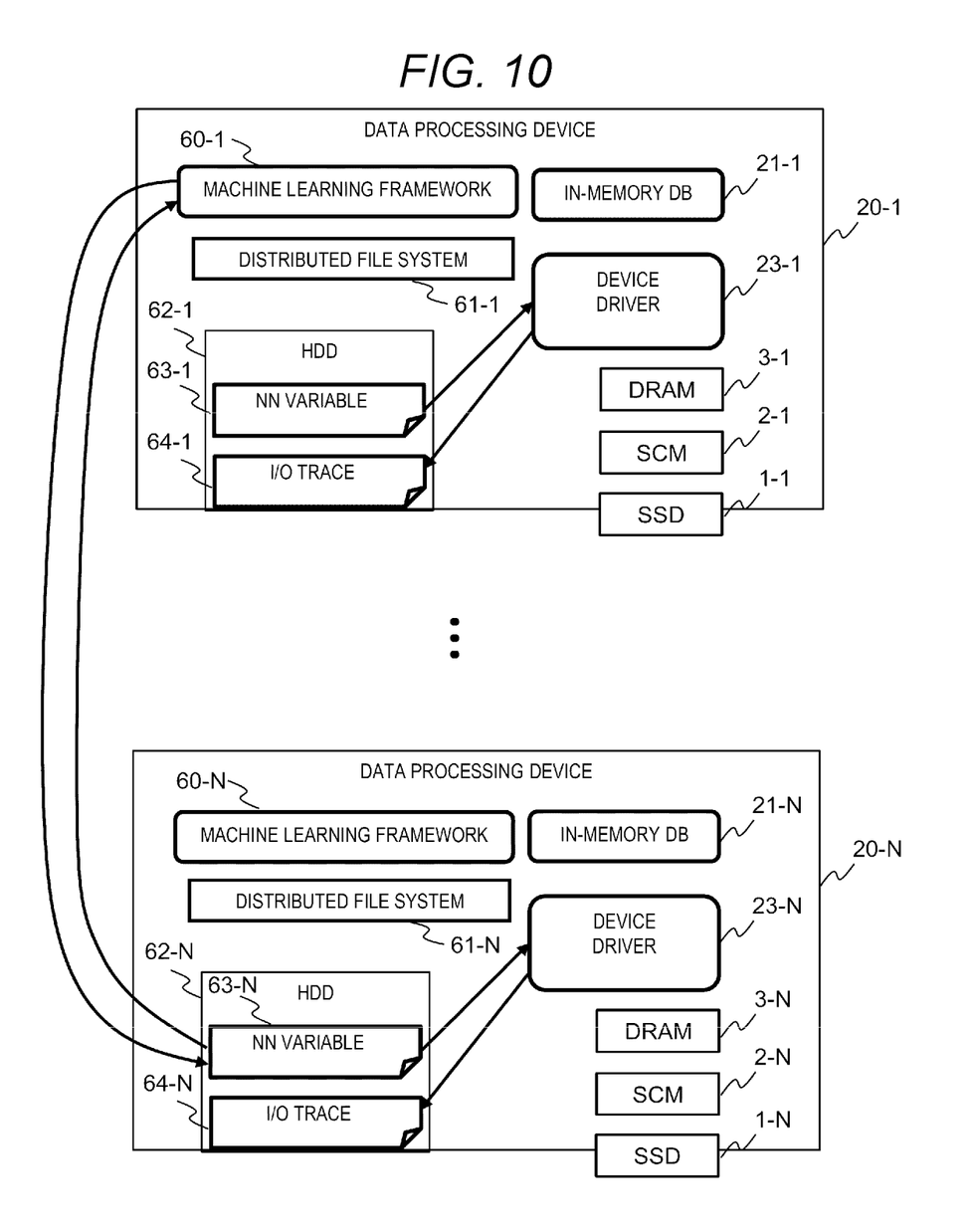
FIG. 10 is a block diagram illustrating a functional configuration of a data processing device according to a fourth embodiment.

FIG. 10 is a block diagram illustrating a functional configuration of a data processing device according to a fourth embodiment.

In FIG. 10, each of the data processing devices 20-1 to 20-N(N is an integer of 2 or more) includes same functions as those of the data processing device 20 and the machine learning server 30 in FIG. 1. The data processing devices 20-1 to 20-N are connected via a network.

Here, each of the data processing devices 20-1 to 20-N includes in-memory databases 21-1 to 21-N, device drivers 23-1 to 23-N, SSDs 1-1 to 1-N, SCMs 2-1 to 2-N, DRAMs 3-1 to 3-N, HDDs 62-1 to 62-N, machine learning frameworks 60-1 to 60-N, and distributed file systems 61-1 to 61-N. The HDDs 62-1 to 62-N store NN variables 63-1 to 63-N and I/O trace compressed data 63-1 to 63-N. The distributed file systems 61-1 to 61-N manages the storage location of the unlearned I/O trace data.

Each machine learning framework 60-1 to 60-N transfers the variable of the neural network to the data processing devices 20-1 to 20-N that hold the unlearned I/O trace data, and returns to original data processing devices 20-1 to 20-N after learning the unlearned I/O trace data at a movement location.

As a result, it is possible to increase the data amount of learning data that can be used in learning while reducing the amount of learning data held by each of the data processing devices 20-1 to 20-N. Therefore, the prediction accuracy of the prediction model of the prefetch can be improved without increasing the capacity of each of the HDDs 62-1 to 62-N.

While certain embodiments have been described, the present invention is not limited to the above-described embodiments and includes various modifications and equivalent configurations within the spirit of the claims. For example, the above-described embodiments have been described in detail in order to make the invention easy to understand, and the invention is not necessarily limited to those which have all the configurations described.

For example, in the embodiment described above, a method using a neural network in which I/O trace data is learned is described as the inference units P1 to P3 . . . in FIG. 1, however, it is not always necessary to use a neural network. For example, an algorithm that predicts data with high access frequency may be constructed based on the I/O trace data, and the algorithm may be used in the inference units P1 to P3 . . . .

What is claimed is:

1. A data processing device comprising:
   a first storage unit;
   a second storage unit that has a larger capacity and a slower access speed than the first storage unit;
   a third storage unit that has a larger capacity than the first storage unit and a slower access speed than the second storage unit;
   a device driver configured to prefetch data stored in the third storage unit into the second storage unit and copies the prefetched data in the second storage unit to the first storage unit;
   an inference unit that is provided outside the device driver;

an allocation unit that is provided outside the device driver and allocates a prefetch buffer to the second storage unit, wherein the device driver includes a page fixing unit that fixes a page of a prefetch buffer allocated to the second storage unit, and a first interface configured to receive an instruction of the prefetch from the inference unit; and a prefetch execution unit configured to execute the prefetch based on an instruction of the prefetch that is received by the first interface, wherein the inference unit is configured to predict an address used to prefetch from the third storage unit, and instruct the prefetch in the device driver based on a prediction result.

2. The storage device according to claim 1, wherein the first storage unit is a Dynamic Random Access Memory (DRAM), the second storage unit is a storage class memory, and the third storage unit is a Solid State Drive (SSD).

3. The data processing device according to claim 1, wherein the inference unit is a neural network in which an address used for the prefetch is learned based on an I/O trace data.

4. The storage device according to claim 1, wherein the device driver includes a hit determination unit configured to execute a hit determination of data prefetched in the second storage unit, and writes data stored in the third storage unit to the first storage unit when the data does not hit; and a copy unit configured to copy data prefetched in the second storage unit to the first storage unit when data prefetched in the second storage unit hits.

5. The data processing device according to claim 1, wherein the device driver is configured to set the number of divided buffer areas, a position, and a size of a block address region of the third storage unit to be prefetched, and is configured to designate the number of divided buffer areas, the position, and the size of the prefetch buffer.

6. The data processing device according to claim 1, wherein the device driver is configured to divide the prefetch buffer by a data size determined based on sequential read performance, and generate a read command from the third storage unit for the prefetch buffer dedicated for the prefetch in advance.

7. The data processing device according to claim 1, wherein the device driver configures a prefetch buffer with a unit of a divided region obtained by dividing the storage region of the second storage unit by a constant data size, and the number of divided buffer areas and the size of the prefetch buffer are variable by varying the number of the divided regions that constitutes the prefetch buffer.

8. The data processing device according to claim 1, wherein the device driver further includes a second interface that acquires the I/O trace data, and a function to acquire the I/O trace data includes an attribute used for the prediction among attributes of the I/O trace data and an argument that selects a length of the I/O trace data.

9. The data processing device according to claim 1, wherein the device driver further includes a third interface that acquires performance information related to the prefetch, and the inference unit is configured to acquire the performance information from the third interface, and determine a timing of the prefetch based on a usage rate of an I/O band used for the prefetch.

10. The data processing device according to claim 1, further comprising:

a prediction model configured to predict a usage rate of an I/O band used for the prefetch, wherein the inference unit is configured to determine the timing of the prefetch based on the usage rate of the I/O band that is predicted by the prediction model.

11. A data processing device comprising:

a first storage unit;

a second storage unit that has a larger capacity and a slower access speed than the first storage unit;

a third storage unit that has a larger capacity than the first storage unit and a slower access speed than the second storage unit;

a device driver configured to prefetch data stored in the third storage unit into the second storage unit and copies the prefetched data in the second storage unit to the first storage unit; and an inference unit that is provided outside the device driver, wherein the device driver includes a first interface configured to receive an instruction of the prefetch from the inference unit, and a prefetch execution unit configured to execute the prefetch based on an instruction of the prefetch that is received by the first interface, and wherein the inference unit configured to predict an address used to prefetch from the third storage unit, and instruct the prefetch in the device driver based on a prediction result, wherein the device driver generates a command queue and a completion notification queue dedicated to the prefetch, and when a normal completion notification is set in the completion notification queue only by the number of the command queue that is submitted by the device driver, a read processing from the third storage unit is completed.

* * * * *